(12) United States Patent
Okumatsu et al.

(10) Patent No.: US 7,068,001 B2
(45) Date of Patent: Jun. 27, 2006

(54) MOTOR CONTROL SYSTEM

(75) Inventors: Yoshihiro Okumatsu, Kiryu (JP); Yasuo Matsuda, Kiryu (JP); Shoji Ohiwa, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/186,847

(22) Filed: Jul. 22, 2005

(65) Prior Publication Data
US 2006/0022628 A1 Feb. 2, 2006

(30) Foreign Application Priority Data

Jul. 29, 2004 (JP) ............................. 2004-220997
Nov. 25, 2004 (JP) ............................. 2004-339756

(51) Int. Cl.
*H02K 37/00* (2006.01)
(52) U.S. Cl. ...................... 318/437; 318/567; 318/254; 318/432
(58) Field of Classification Search ................ 318/138, 318/245, 254, 432, 439, 567
See application file for complete search history.

(56) References Cited

U.S. PATENT DOCUMENTS

| | | | | |
|---|---|---|---|---|
| 6,107,760 | A * | 8/2000 | Lee .............................. | 318/138 |
| 6,462,491 | B1 * | 10/2002 | Iijima et al. ................. | 318/254 |
| 6,462,492 | B1 * | 10/2002 | Sakamoto et al. ........... | 318/254 |
| 6,541,939 | B1 * | 4/2003 | Kishibe et al. .............. | 318/799 |
| 6,826,499 | B1 * | 11/2004 | Colosky et al. .............. | 702/85 |
| 6,831,439 | B1 * | 12/2004 | Won et al. ................... | 318/701 |
| 6,900,607 | B1 * | 5/2005 | Kleinau et al. .............. | 318/432 |
| 2003/0076060 | A1 * | 4/2003 | Colosky et al. ............. | 318/254 |
| 2003/0076061 | A1 * | 4/2003 | Kleinau et al. ............. | 318/432 |
| 2003/0076064 | A1 * | 4/2003 | Kleinau et al. ............. | 318/567 |
| 2003/0076065 | A1 * | 4/2003 | Shafer et al. ............... | 318/567 |
| 2004/0036427 | A1 * | 2/2004 | Mitchell ..................... | 318/254 |
| 2004/0249596 | A1 * | 12/2004 | Ho ............................. | 702/106 |
| 2004/0257027 | A1 * | 12/2004 | Matsuo et al. .............. | 318/722 |
| 2005/0036228 | A1 * | 2/2005 | Kimura et al. ........... | 360/73.03 |
| 2005/0127762 | A1 * | 6/2005 | Miyashita et al. ........ | 310/68 B |

FOREIGN PATENT DOCUMENTS

| | | |
|---|---|---|
| JP | 03-070003 A | 3/1991 |
| JP | 05-018783 A | 1/1993 |
| JP | 05-223593 A | 8/1993 |

(Continued)

*Primary Examiner*—Paul Ip
(74) *Attorney, Agent, or Firm*—Birch,Stewart,Kolasch & Birch,LLP

(57) ABSTRACT

A motor control system according to the present invention comprises a magnetic encoder including a magnetic drum fixed to an output shaft of a motor and a magnetic sensor provided against a periphery of the magnetic drum through a space, an angle calculating unit for calculating a rotational angle of the motor from an output of the magnetic encoder, an angle estimating unit for estimating the rotational angle, an error angle calculating unit for finding an error angle from an calculated angle calculated by the angle calculating unit and an estimated angle estimated by the angle estimating unit, an error-correction value calculating unit for calculating from the error angle an error-correction value that corresponds to the rotational angle, a correction calculating unit for calculating a correction angle or a correction speed from the calculated angle and the error-correction value, and a motor operation controlling unit for outputting to an inverter a voltage command value that corresponds to the correction angle or the correction speed.

7 Claims, 9 Drawing Sheets

FOREIGN PATENT DOCUMENTS

| | | |
|---|---|---|
| JP | 05-322924 A | 12/1993 |
| JP | 06-343284 A | 12/1994 |
| JP | 07-019897 A | 1/1995 |
| JP | 08-061979 A | 3/1996 |
| JP | 10-019602 A | 1/1998 |
| JP | 10-019603 A | 1/1998 |
| JP | 11-285283 A | 10/1999 |
| JP | 2001-012967 A | 1/2001 |
| JP | 2001-037287 A | 2/2001 |
| JP | 2002-199767 A | 7/2002 |

* cited by examiner

FIG. 4
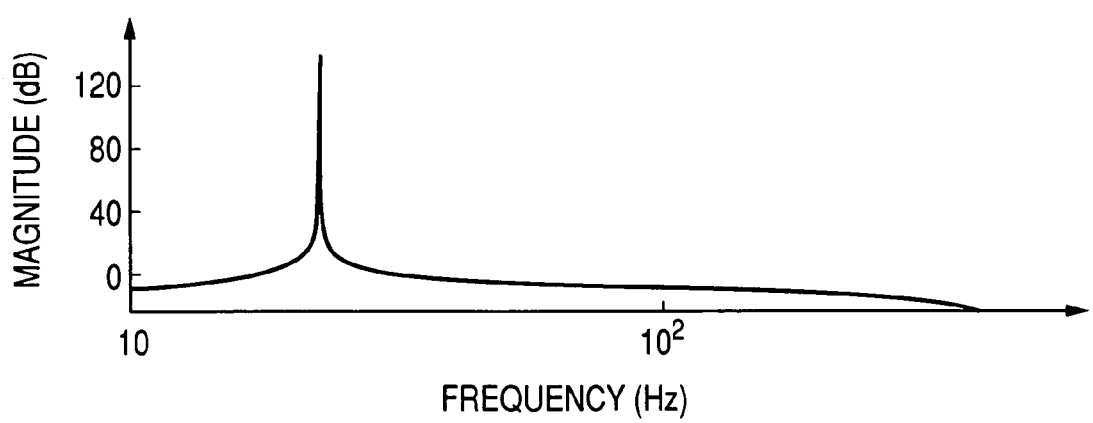
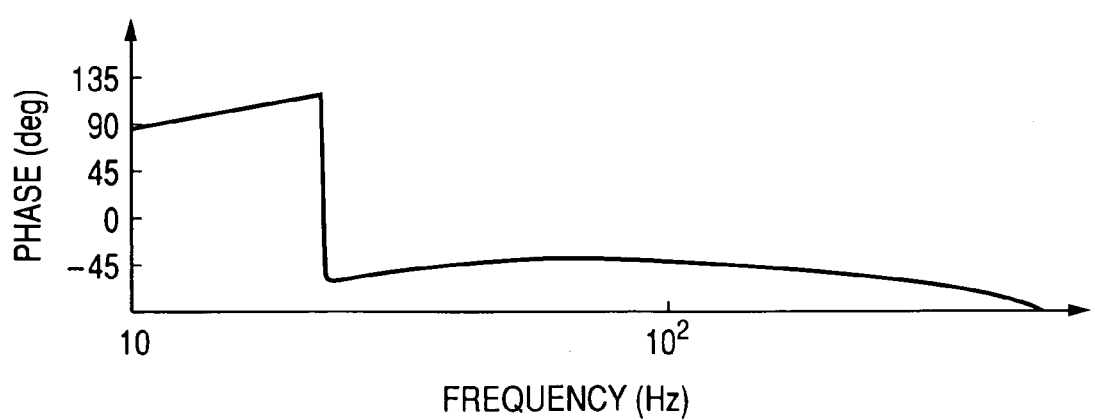

FIG. 7
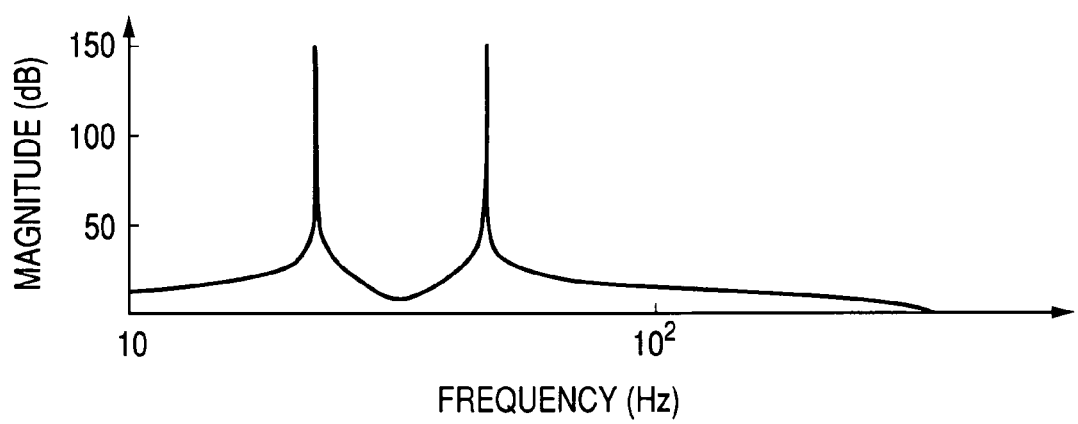
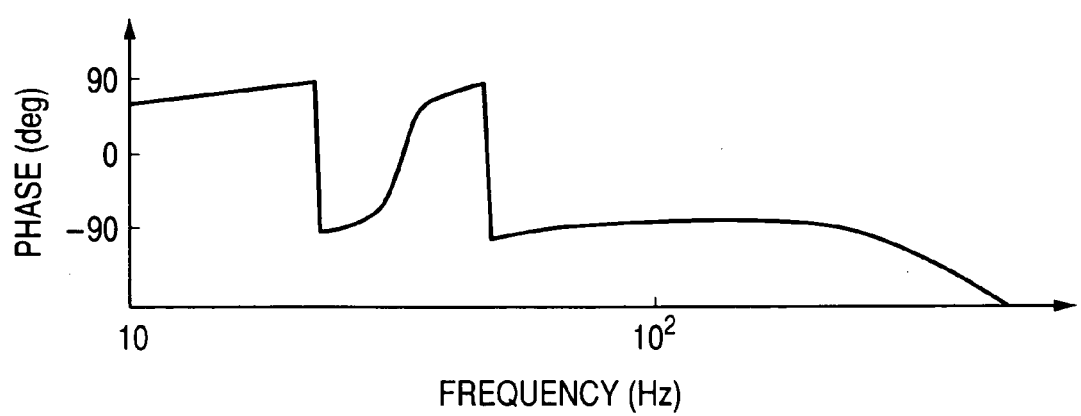

MOTOR CONTROL SYSTEM

BACKGROUND OF THE INVENTION

1. Field of the Invention

This invention relates to a motor control system for controlling a motor.

2. Description of the Prior Art

In a conventional motor control system, a magnetic drum is fixed to an output shaft of a motor and a magnetic sensor is provided against a periphery of the magnetic drum through a space. An angle of a rotor of the motor, i.e., a rotational angle is calculated based on a signal that is detected by the magnetic sensor, and the motor is then controlled based on the calculated angle.

However, in such a motor control system, the magnetic drum may be eccentrically fixed to the output shaft of the motor. In this case, a distance between the periphery of the magnetic drum and the magnetic sensor periodically varies in operation of the motor, so that fluctuations in amplitudes and frequencies are produced in the calculated angle, resulting in rotation irregularity of the motor.

SUMMARY OF THE INVENTION

An object of this invention is to provide a motor control system that can restrain rotation irregularity of a motor which may be produced in operation of the motor.

In accordance with this invention, there is provided a motor control system that comprises a magnetic encoder including a magnetic drum fixed to an output shaft of a motor and a magnetic sensor provided against a periphery of the magnetic drum through a space, an angle calculating means for calculating a rotational angle of the motor from an output of the magnetic encoder, an angle estimating means for estimating the rotational angle, an error angle calculating means for finding an error angle from an calculated angle calculated by the angle calculating means and an estimated angle estimated by the angle estimating means, an error-correction value calculating means for calculating from the error angle an error-correction value that corresponds to the rotational angle, a correction calculating means for calculating a correction angle or a correction speed from the calculated angle and the error-correction value, and a motor operation controlling means for outputting to an inverter a voltage command value that corresponds to the correction angle or the correction speed.

In the motor control system according to the present invention, even if the magnetic drum is off-centered, and fluctuations in amplitudes and frequencies are therefore produced in the calculated angle calculated by the angle calculating means, the calculated angle is corrected by the error-correction value, so that the rotation irregularity that significantly occurs at the specific frequency of the motor rotating at the constant speed can be restrained.

BRIEF DESCRIPTION OF THE DRAWINGS

This and other objects and many of the attendant advantages of the present invention will be readily appreciated as the same becomes better understood by reference to the following detailed description when considered in connection with the accompanying drawings, in which like reference numerals denote the same elements throughout the Figures and wherein:

FIG. 4 is a graph showing the gain characteristics of the Bode diagram of a repeatedly controlling unit of the motor control unit shown in FIG. 2;

FIG. 7 is a graph illustrating the gain characteristics of the Bode diagram of the repeatedly controlling unit of the motor control unit shown in FIG. 6;

DETAILED DESCRIPTION OF THE INVENTION

Figure 1:
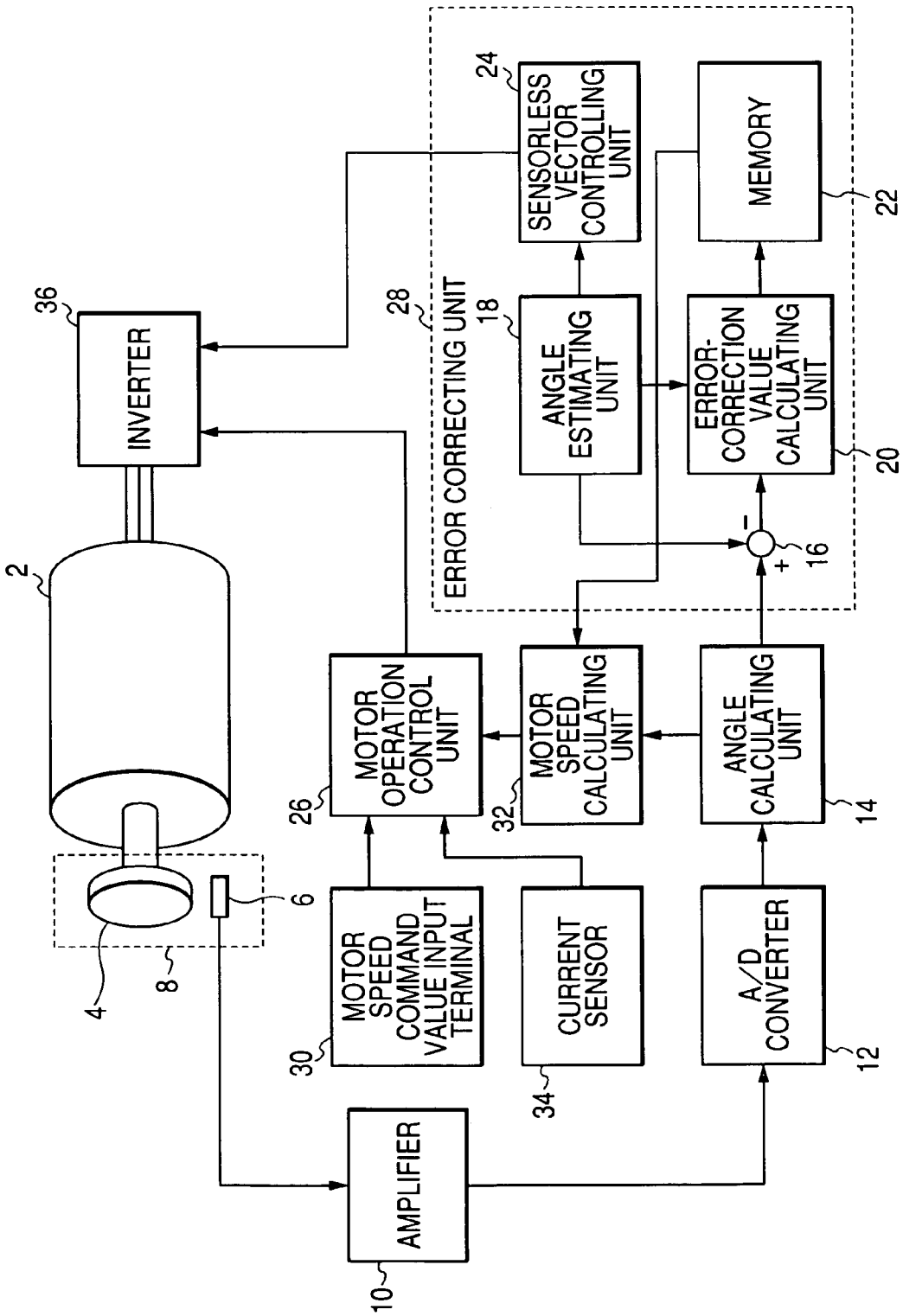
FIG. 1 is a view illustrating a basic construction of a motor control system according to the present invention.

Referring to FIG. 1, a basic construction of a motor control system according to the present invention will be discussed hereinafter. A magnetic drum 4 is fixed to an output shaft of a motor 2 such as a DC brushless motor, and provided with a magnetized pattern which is deposited on the periphery of the magnetic drum and includes N poles and S poles that are alternately and repeatedly disposed on the periphery of the magnetic drum at the same pitch. A magnetic sensor 6 is provided against the periphery of the magnetic drum 4 through a space. The magnetic sensor 6 is comprised of a magnetic resistor device that converts a magnetic field change into an electric potential change and then outputs the electric potential change. The magnetic drum 4 and the magnetic sensor 6 constitute a magnetic encoder 8. There is provided an amplifier 10 that amplifies a detection signal of the magnetic sensor 6. There is provided an A/D converter 12 that converts an analog output of the amplifier 10 into a digital signal. There is provided an angle calculating unit 14 that calculates a rotational angle of the motor 2 from an output of the A/D converter 12. There is provided an angle estimating unit 18 that estimates the rotational angle of the motor 2 from the voltage and current of the motor 2 or a voltage command value and information on the current. There is provided a subtracter 16 that subtracts a calculated angle that is an output of the angle calculating unit 14, from an estimated angle that is an output of the angle estimating unit 18. There is provided an error-correction value calculating unit 20 that calculates an error-correction value that corresponds to the estimated angle, from an error angle that is an output of the subtracter 16. There is provided a memory 22 that stores the error-correction value that is calculated by the error-correction value calculating unit 20. There is provided a sensorless vector control unit 24 that drives the motor in a sensorless vector controlling mode, utilizing the estimated angle and estimated speed that are found by the angle estimating unit 18. The subtracter 16, the angle estimating unit 18, the error-correction value calculating unit 20, the memory 22, and the sensorless vector controlling unit 24 constitute an error correcting unit 28. There is also provided a motor speed command value input terminal 30 that receives a motor speed command value. There is provided a motor speed calculating unit 32 that calculates a rotational speed of the output shaft of the motor 2 from the output of the angle calculating unit 14 and the output of the memory 22. There is provided a current sensor 34 that detects exciting current flowing windings of the motor 2. There is provided a motor operation control unit 26 that receives the output of the motor speed command value input terminal 30, the output of the motor speed calculating unit 32 and the output of the current sensor 34, and controls the exciting current of the motor 2. There is also provided an inverter 36 that applies voltage to the windings of the motor 2 in response to the output of the motor operation control unit 26.

Figure 2:
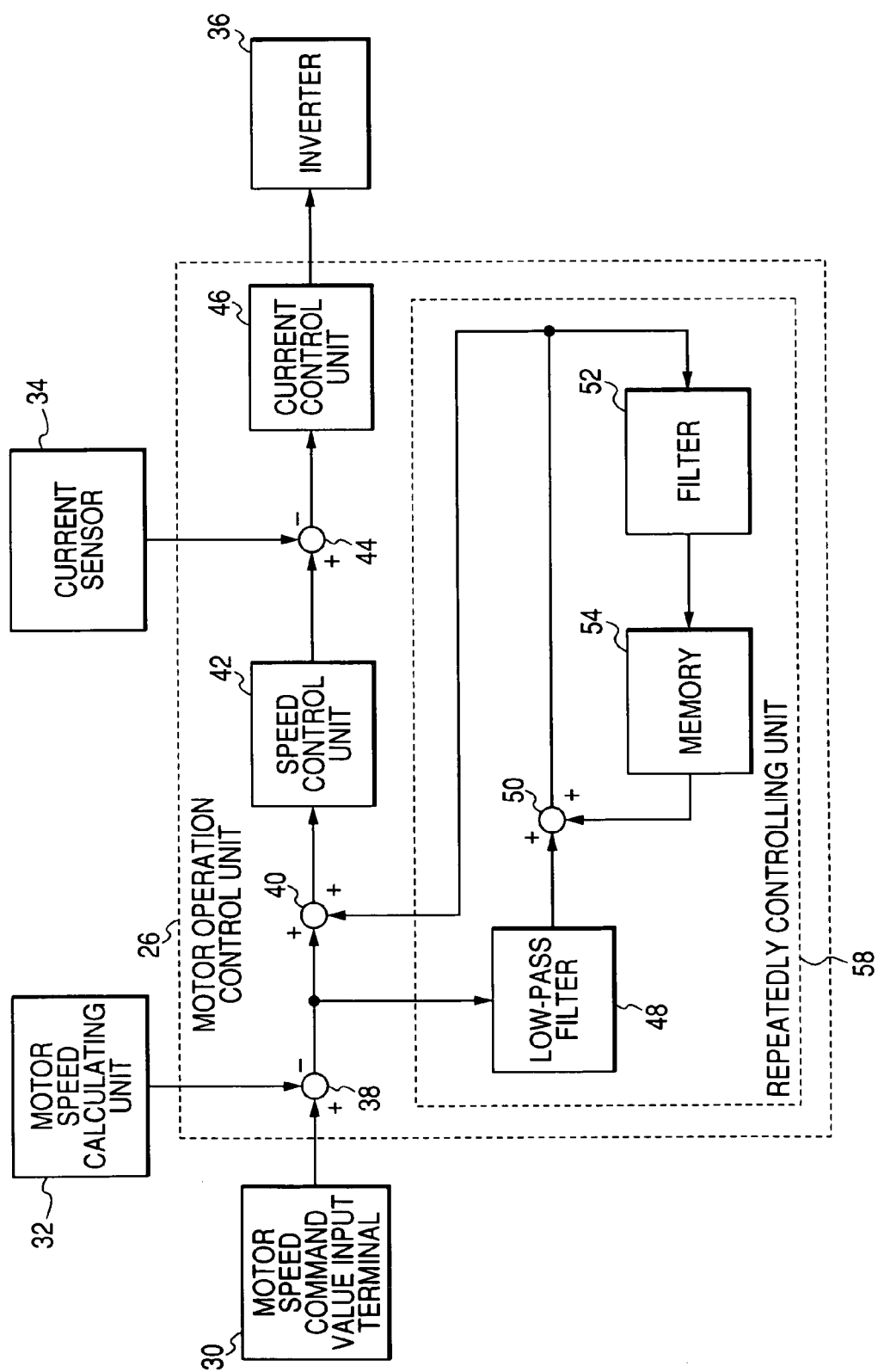
FIG. 2 is a view illustrating a construction of a motor control unit of the motor control system shown in FIG. 1.

Referring now to FIG. 2, a construction of the motor operation control unit 26 of the motor control system shown in FIG. 1 will be discussed hereinafter. There is provided a subtracter 38 that subtracts the calculated speed from the motor speed calculating unit 32, from the motor speed command value from the motor speed command value input terminal 30. There is provided an adder 40 that adds up an output of the subtracter 38 and an output of a repeatedly controlling unit 58. There is provided a speed control unit 42 that finds a current command value on the basis of the output of the adder 40. The speed control unit 42 comprises a PI (proportional integral) control unit. There is provided a subtracter 44 that subtracts a current detection value supplied from the current sensor 34, from the current command value supplied from the speed control unit 42. There is provided a current control unit 46 that finds a voltage command value on the basis of an output of the subtracter 44. The current control unit 46 comprises a PI control unit. There is also provided a low-pass filter 48 that removes noises contained in the output from the subtracter 38. There is provided an adder 50 that adds up an output of the low-pass filter 48 and an output of the memory 54. There is provided a filter 52 having the property of a band-pass filter that is represented by the following Equation (1):

$$G(s) = \frac{\omega b \cdot s}{s^2 + \alpha \cdot \omega b \cdot s + \omega o^2} \quad (1)$$

where s is the Laplace operator, ωo is a center frequency of a cutoff frequency, ωb is a bandwidth of a cutoff frequency, and α is a coefficient for adjusting the magnitude of a gain of the center frequency ωo. Now, where the cutoff frequencies are fc1 and fc2, the center frequency ωo is represented by the following Equation (2) and the bandwidth ωb is represented by the following Equation (3):

$$\omega o = 2\pi \sqrt{fc1 \cdot fc2} \quad (2)$$

$$\omega b = 2\pi (fc2 - fc1) \quad (3)$$

That is, when represented by the Bode diagram in order to restrain periodical rotation-irregularity that occurs at the motor 2 that rotates at a constant speed, the filter 52 has characteristics in which its gain property exhibits a large peak at a specific frequency and sufficiently decreases at a frequency over that being a target for restraining the rotation irregularity. There is provided a memory 54 that receives an output of the filter 52 and stores a rotation irregularity component value. An output of the memory 54 is determined by a frequency which is required to be restrained, and by sampling by the error correcting unit 28. The low-pass filter 48, the filter 52, the memory 54, and the adder 50 constitute the repeatedly controlling unit 58. An output of the adder 50 is an output of the repeatedly controlling unit 58. Also, the subtracter 38, the adder 40, the speed control unit 42, the subtracter 44, the current control unit 46, and the repeatedly controlling unit 58 constitute the motor operation control unit 26. The voltage command value that is an output of the current control unit 46 is an output of the motor operation control unit 26.

The amplifier 10, the A/D converter 12, the angle calculating unit 14 constitute an angle calculating means that calculates the rotational angle of the motor from the output of the magnetic encoder. Also, the angle estimating unit 18 constitutes an angle estimating means that estimates the rotational angle. Furthermore, the subtracter 16 constitutes an error angle calculating means that finds an error angle from the calculated angle calculated by the angle calculating means and the estimated angle estimated by the angle estimating means. Also, the error-correction value calculating unit 20 constitutes an error-correction value calculating means that calculates an error-correction value that corresponds to the rotational angle, from the error angle. Also, the motor speed calculating unit 32 constitutes a correction calculating means that calculates a correction speed from the calculated angle and the error-correction value. Furthermore, the motor operation control unit 26 constitutes a motor operation controlling means that outputs to the inverter the voltage command value corresponding to the correction speed. Also, the memory 22 constitutes a first memory means that stores the error-correction value. Furthermore, the sensorless vector control unit 24 constitutes a sensorless vector control means that drives the motor in a sensorless vector control mode on the basis of an output of the angle estimating means. Also, the filter 52 constitutes a filter means that decreases only rotation irregularity of the specific frequency. Furthermore, the memory 54 constitutes a second memory means that stores a rotation irregularity component value. Also, the repeatedly controlling unit 58 constitutes a repeatedly controlling means.

In the motor control system, the motor 2 is driven in the sensorless vector control mode by the sensorless vector control unit 24 before the motor 2 is really driven. In this case, where a sine wave-formed output of the magnetic sensor 6 is two-phase, a mechanical angle speed of the magnetic drum 4 is ωr, an electrical angle speed of the magnetic drum 4 is ωe, an amplitude of ideal outputs Va, Vb of A, B phases of the magnetic sensor 6 is A0, amplitude change due to eccentricity of the magnetic drum 4 is a1, a phase corresponding to the amplitude change is δ1, frequency change due to the eccentricity of the magnetic drum 4 is a2, a phase corresponding to the frequency change is δ2, and time is t, outputs Va, Vb of the magnetic sensor 6 are represented by the following Equations (4) and (5):

$$Va = A0\{1 + a1 \cdot \sin(\omega r \cdot t + \delta 1)\} \sin\{\omega e \cdot t + a2 \cdot \sin(\omega r \cdot t + \delta 2)\} \quad (4)$$

$$Vb = A0\{1 + a1 \cdot \sin(\omega r \cdot t + \delta 1)\} \cos\{\omega e \cdot t + a2 \cdot \sin(\omega r \cdot t + \delta 2)\} \quad (5)$$

An angle θmr of the magnetic drum 4 is represented by the following Equation (6) from the Equations (4) and (5).

$$\theta mr = \tan^{-1}\frac{Va}{Vb} = \omega e \cdot t + a2 \cdot \sin(\omega r \cdot t + \delta 2) \quad (6)$$

Where pulse count of one rotation of the magnetic drum 4 is kmr and number of polar pair of the motor 2 is P, the calculated angle (electric angle) θre_mr that is calculated from the output of the magnetic sensor 6 by the angle calculating unit 14 is represented by the following Equation (7).

$$\theta\text{re\_mr} = \frac{P}{kmr}\{\omega e \cdot t + a2 \cdot \sin(\omega r \cdot t + \delta 2)\} \quad (7)$$

On the other hand, the estimated angle θre_est estimated by the angle estimating unit 18 coincides with an actual rotational angle of the motor 2 within the range of estimable frequency that is determined by the low-pass characteristics of the angle estimating unit 18. Where the rotational angle of the motor 2 is θre, estimable maximum frequency is fc, and f≦fc, the estimated angle θre_est of the motor 2 that is estimated by the angle estimating unit 18 is represented by the following Equation (8):

$$\theta\text{re\_est} = \theta\text{re} \quad (8)$$

Therefore, the error angle θerr due to the eccentricity of the magnetic drum 4, that is obtained by the subtracter 16 is obtained on the basis of the calculated angle θre_mr and the estimated angle θre_est so as to be represented by the following Equation (9):

$$\theta err = \theta\text{re\_mr} - \theta\text{re\_est} = \frac{P}{kmr}a2 \cdot \sin(\omega r \cdot t + \delta 2) \quad (9)$$

The error-correction value calculating unit 20 finds the error-correction value corresponding to the rotational angle, from the error angle θerr, and the memory 22 stores the error-correction value of one rotation of the magnetic drum 4.

When the motor 2 is driven by using of the magnetic encoder 8, the motor speed calculating unit 32 reads from the memory 20 the error-correction value corresponding to the calculated angle, subtracts the error-correction value corresponding to the arithmetic angle from the calculated angle, to thereby make corrections, and calculates the rotation speed of the output shaft of the motor 2 from the corrected value. The motor operation control unit 26 then outputs to the inverter 36 a current-command value corresponding to a corrected speed that is the output of the motor speed calculating unit 32.

In the motor control system, even if the magnetic drum 4 is off-centered, and fluctuations in amplitudes and frequencies are therefore produced in the calculated angle calculated by the angle calculating unit 14, the calculated angle is corrected by the error-correction value, so that the rotation irregularity that significantly occurs at the specific frequency of the motor 2 rotating at the constant speed can be restrained. Also, the calculated angle is corrected by the error-correction value, and an eccentricity accuracy of the magnetic drum 4 and an arranging accuracy of the magnetic sensor 6 are therefore alleviated, so that the motor can be produced at low cost. Furthermore, as compared to a case where an output signal waveform of the magnetic sensor 6 is corrected, the corrections can be made without any special equipment. Also, the addition of the error correcting unit 28, comprising the angle estimating unit 18, the memory 22 and the like, to a conventional motor driving circuit, facilitates correcting of the output of the magnetic encoder, without any special equipment. Furthermore, the error correcting unit 28 comprising the sensorless vector control unit 24 is provided, so that the error-correction value can be found after shipment of the motor. Also, the motor operation control unit 26 is provided with the repeatedly controlling unit 58 which includes the filter 52, the gain property of which has a large peak at the specific frequency and sufficiently decreases at a frequency over that being the target for restraining the rotation irregularity, so that the rotation irregularity that occurs due to the effect of a cogging torque of the motor, the effect of periodically changed loads and the like can be steadily restrained.

Figure 3:
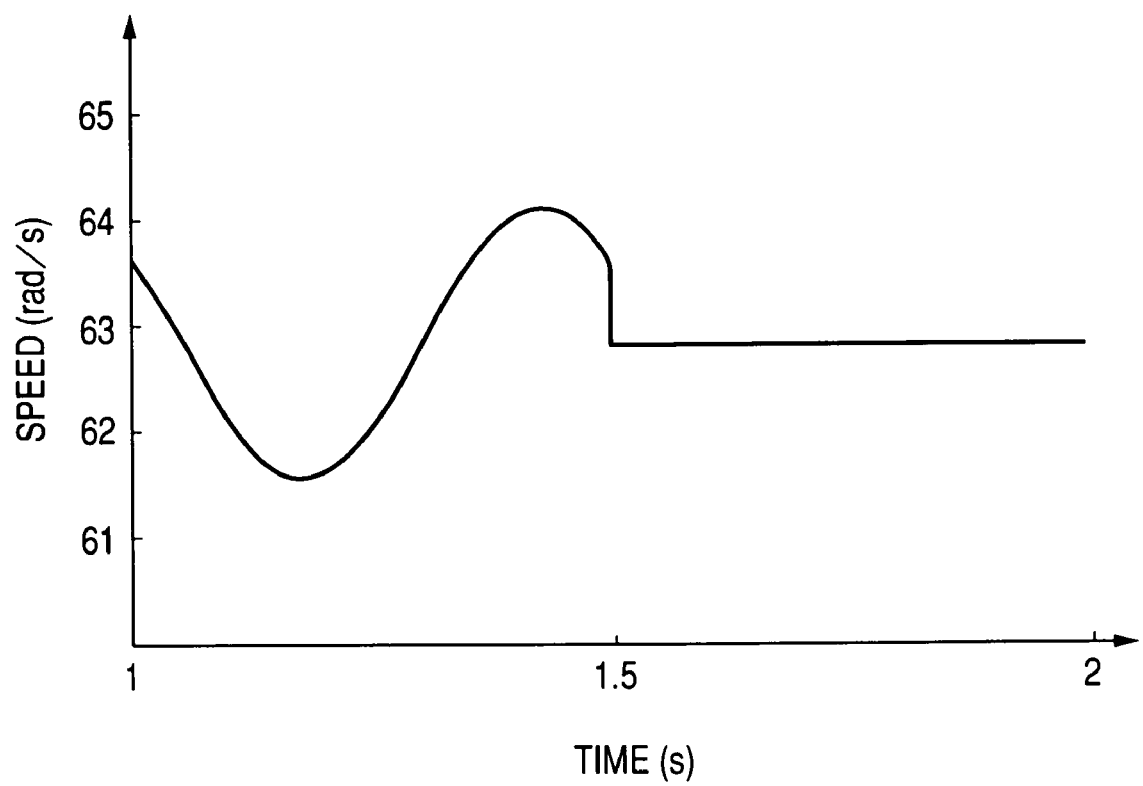
FIG. 3 is a graph illustrating the effects of the motor control system shown in FIG. 1.

FIG. 3 is a graph showing changes in the rotation speed of the motor 2 in a case where the speed control of the motor 2 is carried out utilizing the output of the magnetic encoder 8 in the event that eccentricity of the magnetic drum 4 exists, and showing cases (1–1.5 s) where the calculated angle is not corrected by the error-correction value, and cases (1.5–2 s) where the calculated angle is corrected by the error-correction value. As seen from the graph, it is appreciated that changes in rotation are eliminated by correcting of the calculated angle.

FIG. 4 is a graph showing the gain property of the Bode diagram of the repeatedly controlling unit 58. As seen from this graph, it is appreciated that the gain property has a large peak at a frequency required to be restrained, and sufficiently decreases at a frequency region over a frequency being the target for restraining rotation the irregularity, and both a stability and a control property can be improved as compared to a conventional method.

Figure 5:
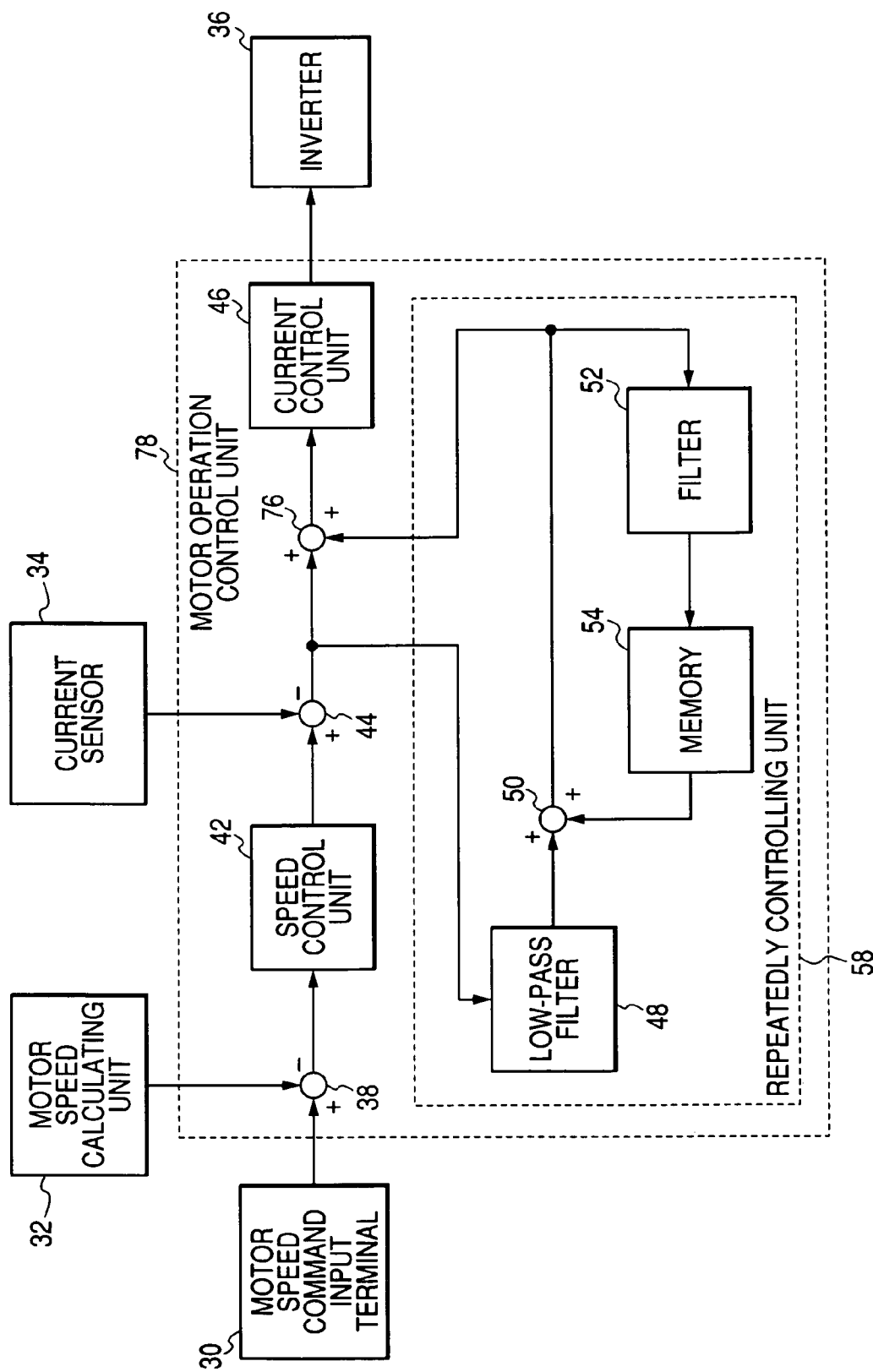
FIG. 5 is a view illustrating a construction of a motor control unit of a motor control system according to another embodiment of the present invention.

Referring to FIG. 5, a construction of a motor operation control unit of a motor control system according to another embodiment of the present invention will be discussed hereinafter. There is provided the subtracter 38 that subtracts the calculated speed from the motor speed calculating unit 32, from the motor speed command value from the motor speed command value input terminal 30. There is provided the speed control unit 42 that finds the current command value on the basis of the output of the subtracter 38. There is provided the subtracter 44 that subtracts a current detection value from the current sensor 34, from the current command value from the speed control unit 42. The repeatedly controlling unit 58 receives the output of the subtracter 44. There is provided an adder 76 that adds up the output of the subtracter 44 and the output of the repeatedly controlling unit 58. There is provided the current control unit 46 that finds the voltage command value on the basis of an output of the adder 76. The subtracter 38, the speed control unit 42, the subtracter 44, the repeatedly controlling unit 58, the adder 76, and the current control unit 46 constitute a motor operation control unit 78. The voltage command value that is the output of the current control unit 46 is an output of the motor operation control unit 78.

The motor operation control unit 78 constitutes a motor operation controlling means that outputs to the inverter a voltage value corresponding to a correction speed.

Figure 6:
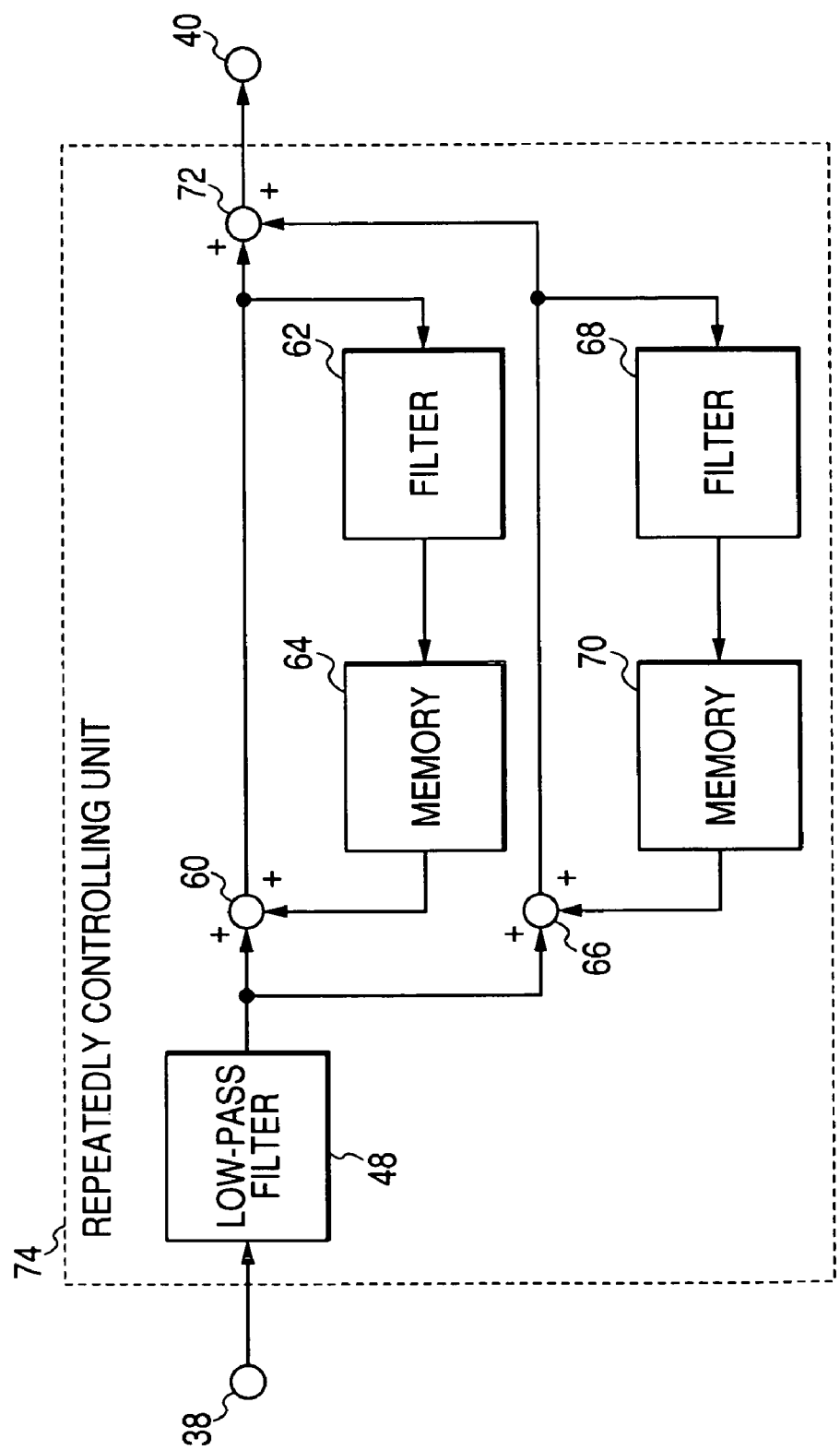
FIG. 6 is a view illustrating a construction of a repeatedly controlling unit of a motor control unit of a motor control system according to another embodiment of the present invention.

Referring to FIG. 6, a construction of a repeatedly controlling unit of a motor operation control unit of a motor control system according to another embodiment of the present invention will be discussed hereinafter. There is provided an adder 60 that adds up the output of the low-pass filter 48 and an output of a memory 64. There is provided a filter 62 that has a property of the band-pass filter that is represented by the following Equation (10), where a center frequency is ωo1, a bandwidth is ωb1 and a coefficient for adjusting the magnitude of the gain of the center frequency ωo1 is α, $$G1(s) = \frac{\omega b1 \cdot s}{s^2 + \alpha \cdot \omega b1 \cdot s + \omega o1^2} \quad (10)$$

There is provided the memory 64 that receives the output of the filter 62. There is provided an adder 66 that adds up the output of the low-pass filter 48 and the output of the memory 70. There is provided a filter 68 that has the property of the band-pass filter that is represented by the following Equation (11), where a center frequency is ωo2, a bandwidth is ωb2 and a coefficient for adjusting the magnitude of the gain of the center frequency ωo2 is β, $$G2(s) = \frac{\omega b2 \cdot s}{s^2 + \beta \cdot \omega b2 \cdot s + \omega o2^2} \quad (11)$$

There is provided the memory 70 that receives the output of the filter 68. There is provided the adder 72 that adds up the output of the adder 60 and the output of the adder 66. The low-pass filter 48, the filter 62, the memory 64, the adder 66, the filter 68, the memory 70, and the adder 72 constitute a repeatedly controlling unit 74. The output of the adder 72 is an output of the repeatedly controlling unit 74.

In the repeatedly controlling unit 74, the repeatedly controlling unit is an equivalent having a filter having the band-pass filter property represented by the following Equation (12):

$$G(s) = 1 - \frac{(1-G1)(1-G2)}{2-G1-G2} \quad (12)$$
$$= \frac{s^4 + b1 \cdot s^3 + b2 \cdot s^2 + b3 \cdot s + b4}{2s^4 + a1 \cdot s^3 + a2 \cdot s^2 + a3 \cdot s + a4}$$

where, a1–a4 and b1–b4 are represented by the following Equations:

$a1 = (2\alpha-1)\omega b1 + (2\beta-1)\omega b2$ $a2 = 2(\omega o1^2 - \omega o2^2) + (2\alpha \cdot \beta - \alpha - \beta)\omega b1 \cdot \omega b2$ $a3 = (2\alpha-1)\omega b1 \cdot \omega o2^2 + (2\beta-1)\omega b2 \cdot \omega o1^2$ $a4 = 2\omega o1^2 \cdot \omega o2^2$ $b1 = \alpha \cdot \omega b1 + \beta \cdot \omega b2$ $b2 = \omega o1^2 + \omega o2^2 + (\alpha \cdot \beta - 1)\omega b1 \cdot \omega b2$ $b3 = \alpha \cdot \omega b1 \cdot \omega o2^2 + \beta \cdot \omega b2 \cdot \omega o1^2$ $b4 = 2\omega o1^2 \cdot \omega o2^2$ Each of the filters 62, 68 constitutes a filter means that decreases only rotation irregularity of the specific frequency. Each of the memories 64, 70 constitutes a second memory means that stores a rotation irregularity component value. The repeatedly controlling unit 74 constitutes a repeatedly controlling means.

Figure 8:
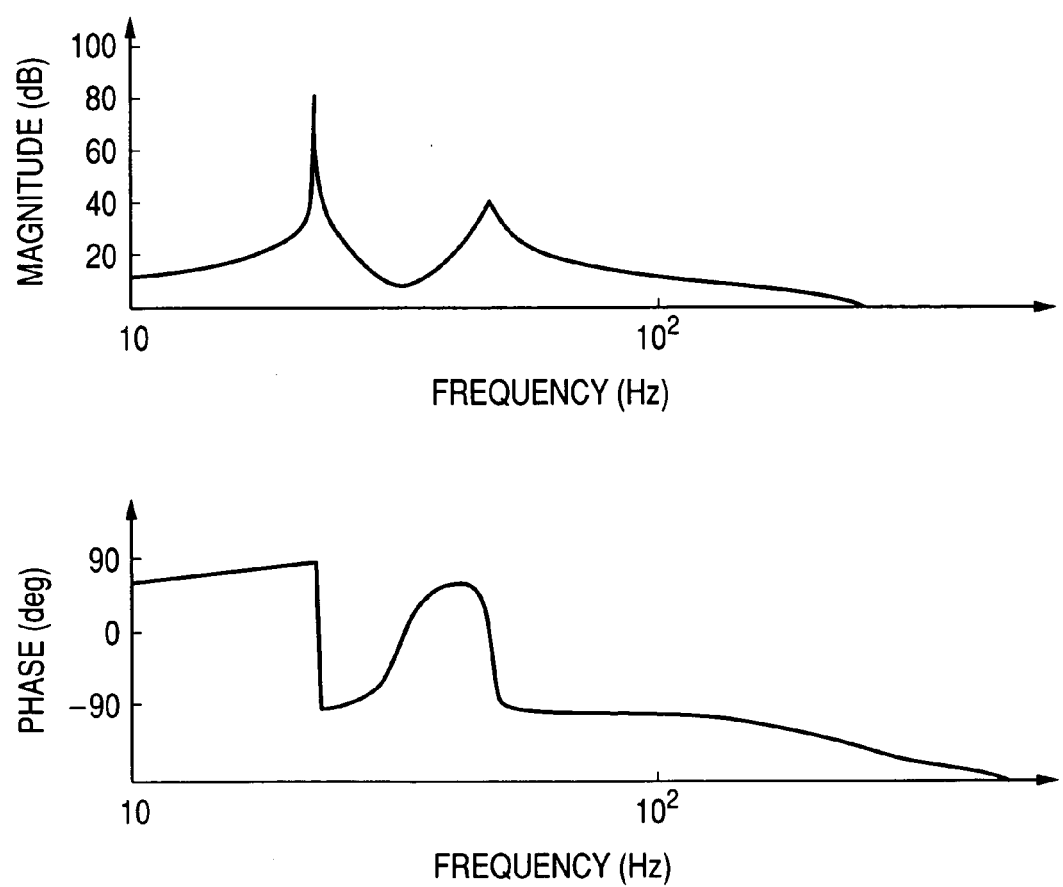
FIG. 8 is a graph showing the effects of the motor control unit shown in FIG. 6.

As shown in FIG. 7, the gain property of the Bode diagram of the repeatedly controlling unit 74 similar to that employing the filter having the property of the band-pass filter that is represented by the Equation (12) exhibits peaks at two bands of frequencies. In a case where there are two or more frequencies to be generally required to be restrained, the magnitude of the rotation irregularity of the frequencies is different. In this case, the peak of the transmission property of the repeatedly controlling unit 74 can be controlled by adjusting the coefficient α of the Equation (10) and the coefficient β of the Equation (11). For example, as shown in FIG. 8, it is possible to cause the magnitude of the rotation irregularity to coincide with the magnitude of the peak in the gain property of the Bode diagram of the repeatedly controlling unit.

Thus, when the rotation irregularity exists in several frequencies, it is possible to restrain the rotation irregularity while keeping stability, by adjusting the coefficients α, β and causing the rotation irregularity to coincide with the transmission property of the repeatedly controlling unit 74.

Figure 9:
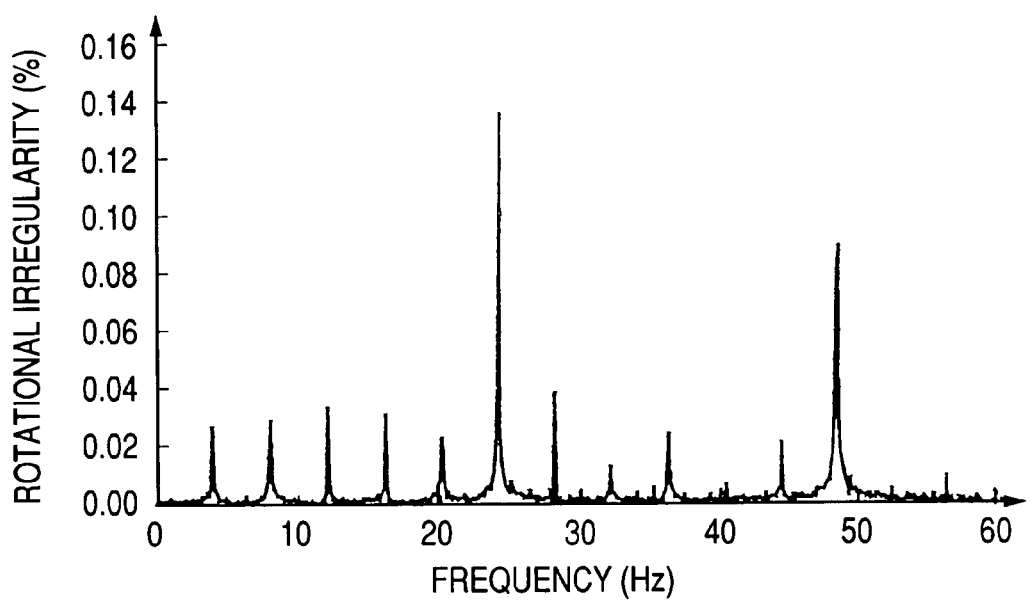
FIG. 9 is a graph showing the results of testing in which rotation irregularity of a motor speed is analyzed in terms of frequencies.
Figure 10:
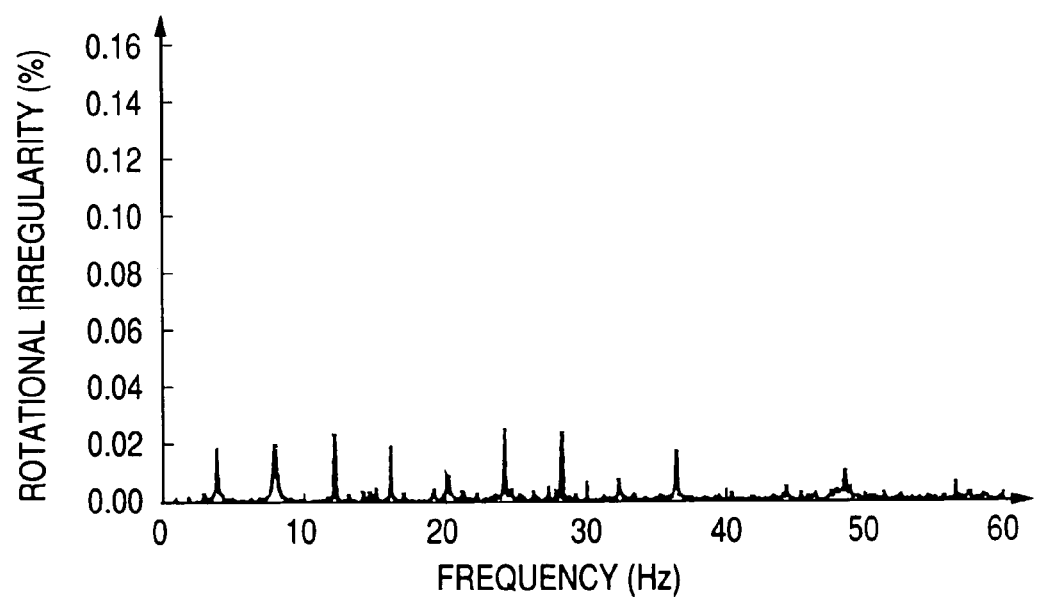
FIG. 10 a graph illustrating the results of testing in which rotation irregularity of a motor speed is analyzed in terms of frequencies.

FIGS. 9 and 10 are each a graph showing the test results which were obtained by analyzing frequencies in rotation irregularity of the speed. FIG. 9 illustrates a case where the repeatedly controlling unit is not used. FIG. 10 shows a case where the repeatedly controlling unit 74 is used. In these Figures, the horizontal axis designates frequencies and the vertical axis denotes the magnitude of respective frequency components of rotation irregularity relative to a target speed. It is seen from FIG. 9 that the peak of rotation irregularity exhibits at 24 Hz and 48 Hz. Therefore, the filters 62, 68 were designed so that the transmission properties of the filters exhibited peaks at 24 Hz and 48 Hz, and the peak at 48 Hz was set at about two third of the peak at 24 Hz. As a result, in the case where the repeatedly controlling unit was not used, rotation irregularity comes into existence as shown in FIG. 9, but in the case where the repeatedly controlling unit 74 was used, rotation irregularity components of arbitrary frequencies significantly decreased as shown in FIG. 10 and the motor could be steadily driven.

Incidentally, while the motor operation control units 26, 78 that output to the inverter the voltage command value corresponding to the correction speed are employed in the above-mentioned embodiments, a motor operation control means that is adapted to output to the inverter a voltage command value that corresponds to the correction angle that is calculated from the calculated angle and the error-correction value, may be employed.

Furthermore, the error correcting means that comprises the angle estimating means, the error angle calculating means, and the error-correction value calculating means may be comprised of a computer. In this case, the error correcting means can be constructed at low cost.

According to the present invention, when a motor is rotation-controlled at a constant speed, rotation irregularity can be highly restrained, so that the present invention can be widely applied to a motor control system in which a rotation accuracy including rotation irregularity is required.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A motor control system comprising:
   a) a magnetic encoder including a magnetic drum fixed to an output shaft of a motor, and a magnetic sensor provided against a periphery of said magnetic drum through a space;
   b) an angle calculating means for calculating a rotational angle of said motor from an output of said magnetic encoder;
   c) an angle estimating means for estimating said rotational angle;
   d) an error angle calculating means for finding an error angle from a calculated angle calculated by said angle calculating means and an estimated angle estimated by said angle estimating means;
   e) an error-correction value calculating means for calculating from said error angle an error-correction value that corresponds to said rotational angle;
   f) a correction calculating means for calculating a correction angle or a correction speed from said calculated angle and said error-correction value; and
   g) a motor operation controlling means for outputting to an inverter a voltage command value that corresponds to said correction angle or said correction speed.

2. A motor control system according to claim 1, wherein said angle estimating means is adapted to estimate said rotational angle from voltage and current that are applied to said motor.

3. A motor control system according to claim 1, further including a first memory means in which stores said error-correction value.

4. A motor control system according to claim 1, further including a sensorless vector controlling means for driving said motor in a sensorless vector control mode on the basis of an output of said angle estimating means.

5. A motor control system according to claim 1, wherein said motor operation controlling means is provided with a repeatedly controlling means that comprises at least one filter means for decreasing only rotation irregularity of a specific frequency and at least one second memory means for storing a rotation irregularity component value.

6. A motor control system according to claim 5, wherein a filter means that has a peak in a restrained frequency only and does not have a peak in frequencies except said restrained frequency is employed as said filter means.

7. A motor control system according to claim 5, wherein a filter means that can set coefficients for adjusting a magnitude of a gain of a center frequency of a cutoff frequency.

* * * * *